UNITED STATES PATENT OFFICE.

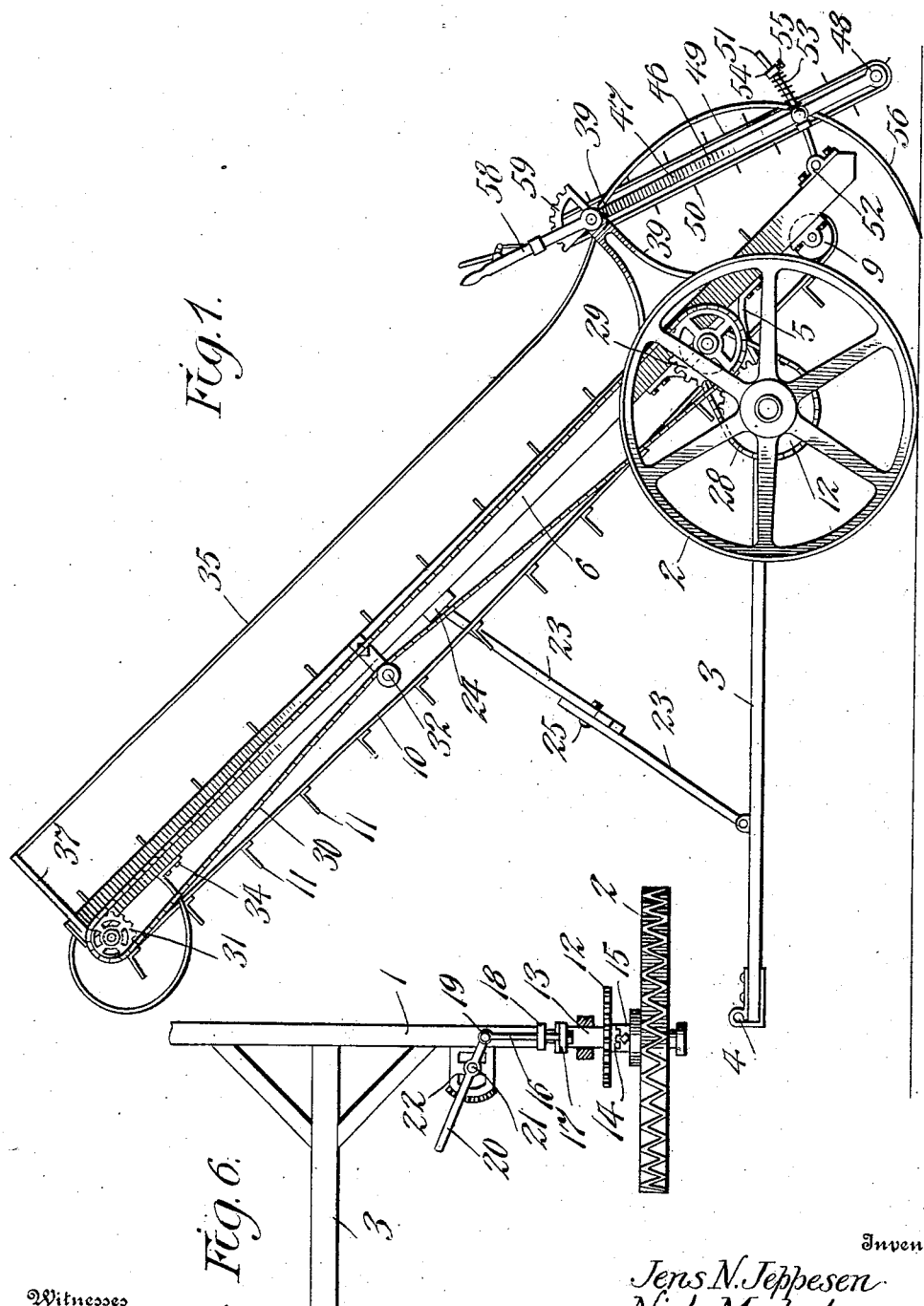

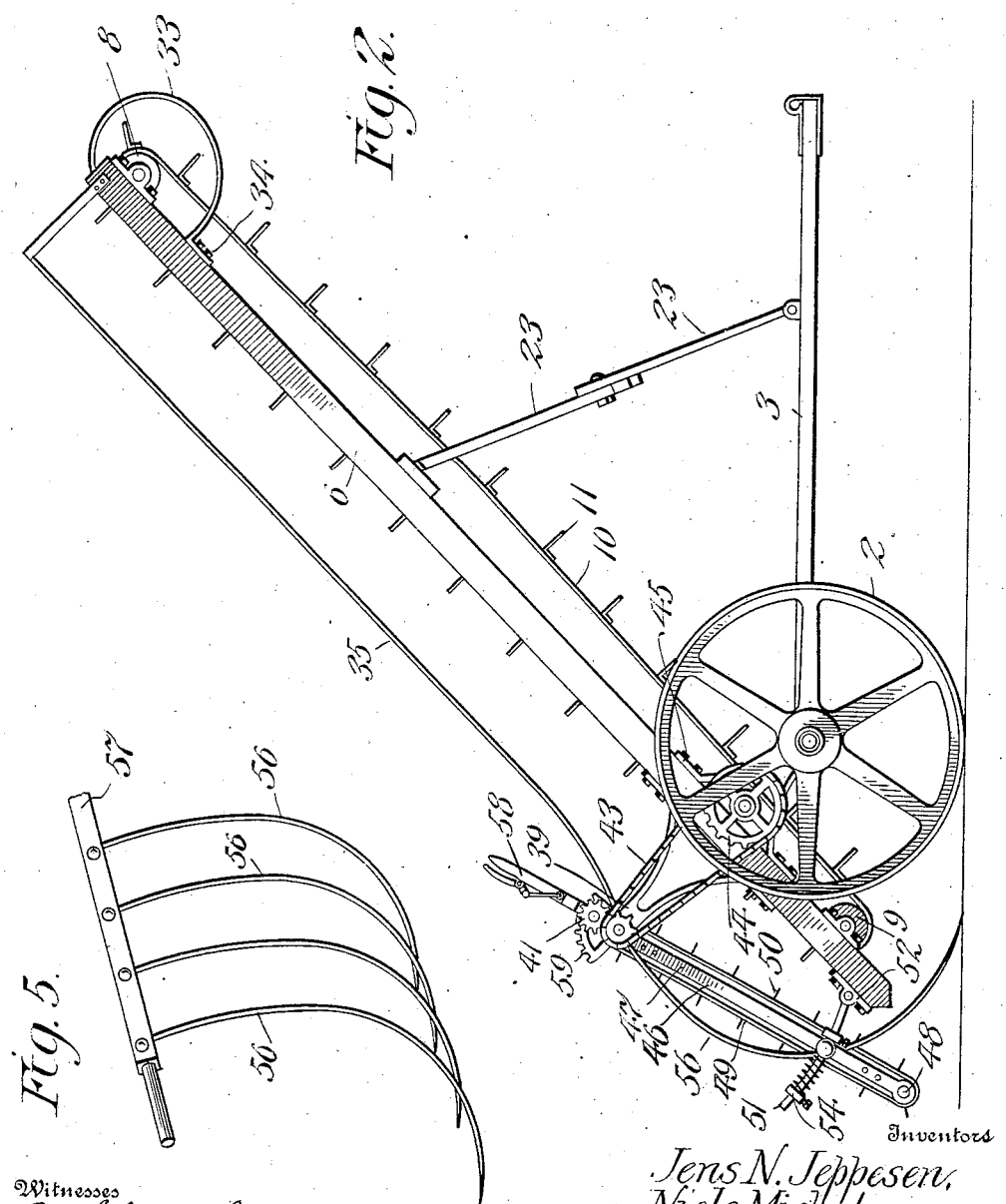

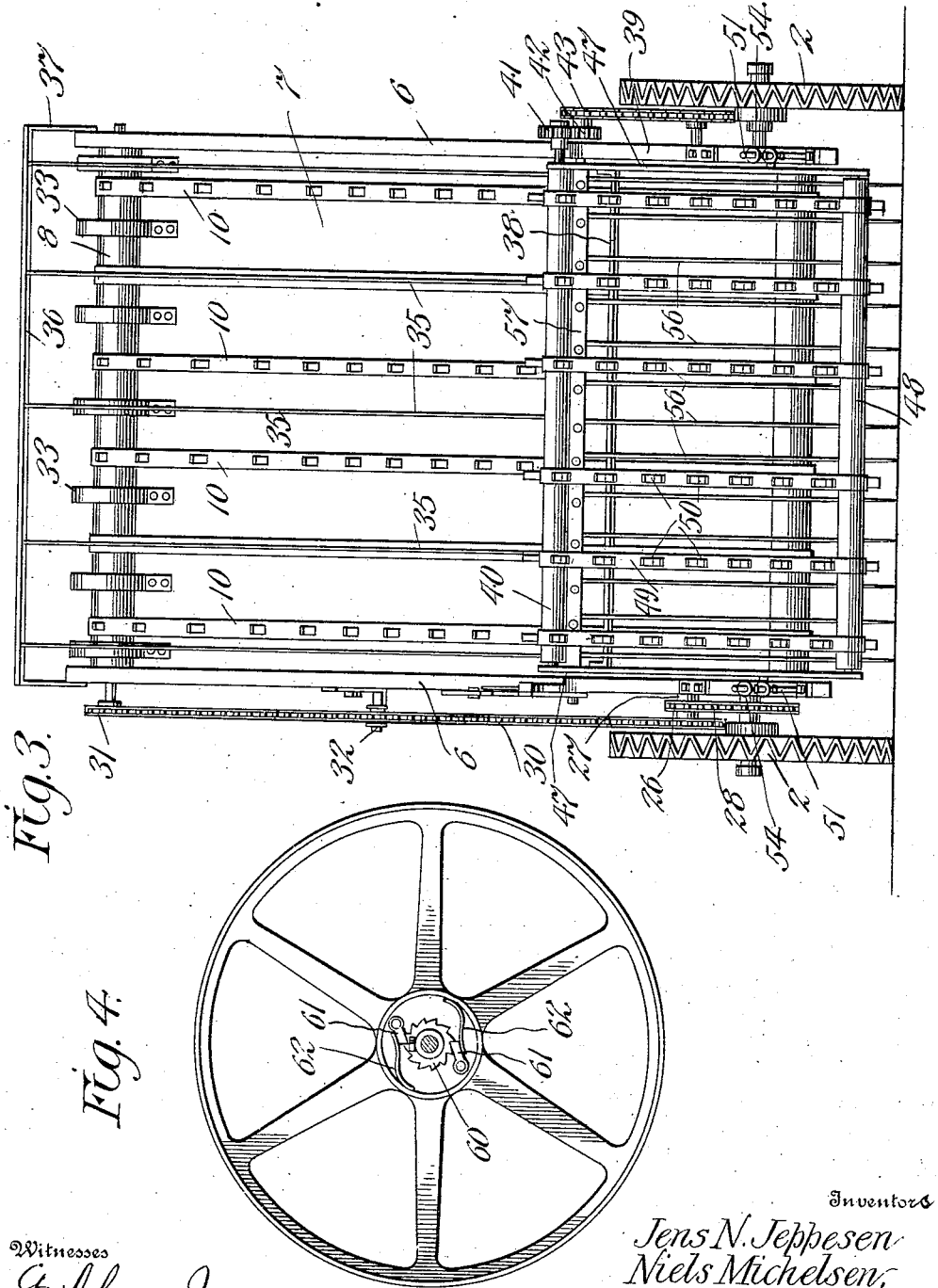

JENS N. JEPPESEN AND NIELS MICHELSEN, OF MONROE, UTAH.

HAY-LOADER.

No. 855,317.　　　　Specification of Letters Patent.　　　　Patented May 28, 1907.

Application filed October 13, 1906. Serial No. 338,824.

*To all whom it may concern:*

Be it known that we, JENS N. JEPPESEN and NIELS MICHELSEN, citizens of the United States, residing at Monroe, in the county of Sevier and State of Utah, have invented new and useful Improvements in Hay-Loaders, of which the following is a specification.

This invention relates to hay rakes, designed more particularly for gathering alfalfa, but which may be used for raking ordinary hay.

One of the principal objects of the invention is to provide a hay rake to be trailed behind the hay wagon for gathering the hay and carrying it up and depositing it into the wagon.

Another object of the invention is to provide an endless conveyer which will travel at about the same rate of speed as the wagon to prevent the tearing of the hay or leaves of alfalfa and to provide for the smooth operation of the device.

Another object of the invention is to provide means for stripping the hay from the conveyer flights at the upper discharge end of the conveyer to prevent the hay from being carried down upon the lower stretch of the conveyer.

Still another object of the invention is to provide means for preventing the wind from carrying the hay off the conveyer after it has been placed thereon.

The foregoing and other objects are attained by means of the construction illustrated in the accompanying drawings, in which:

Figure 1 is a side elevation of a hay rake made in accordance with our invention. Fig. 2 is a side elevation of the opposite side of the machine from that shown in Fig. 1. Fig. 3 is a rear elevation of the machine. Fig. 4 is an elevation looking at the inner side of one of the ground wheels of the hay rake. Fig. 5 is a detail perspective view of the rake shaft and rake teeth, said shaft being broken away at one end. Fig. 6 is a detail plan view of one of the ground wheels, a portion of its axle, and a clutch and lever for operating the same for throwing the conveyer out of operation.

Referring to the accompanying drawings for a more particular description of our invention, the numeral 1 designates the axle to which the ground wheels 2 are journaled. A draft tongue 3 is connected to the axle 1 and provided with a suitable clevis 4 for connecting the rake to the rear end of the hay wagon. An endless conveyer is supported upon the axle 1 by means of brackets 5, said conveyer comprising side bars 6 connected by a bottom 7 and having rollers 8 and 9 journaled to the lower side thereof. Endless conveyer belts 10 pass around the rollers 8 and 9, said belts being provided with outwardly projecting flights 11 to carry the hay from the lower to the upper end of said conveyer. A sprocket wheel 12 connected to a sliding sleeve 13 mounted to slide upon the axle 1 carries a clutch 14 adapted to engage a clutch member 15 on the inner end of the hub of one of the ground wheels 2, and this clutch is thrown into and out of operative position by means of a link 16 connected to a lug 17 on the sleeve 13, said link passing through a lug 18 and being pivotally connected at 19 to a lever 20. The lever 20 is pivoted at 21 to a rack 22 for holding the lever 20 in its adjusted position. To hold the endless conveyer at the required inclination to deposit the hay into the wagon, adjustable brace bars 23 are connected at one end to the tongue 2 and at the opposite end to the underside of the conveyer, as at 24, Fig. 1, said brace bars being adjustable by means of the bolt 25 passing through the slotted overlapping ends of the bars 23. A sprocket wheel 26 mounted on a shaft 27 journaled at one side of one of the bars 6 is engaged by a sprocket chain 28 which passes around the sprocket 12 on the axle 1. A sprocket wheel 29 on the shaft 27 is provided with a sprocket chain 30 which passes around the sprocket wheel 31 on the upper roller shaft of the roller 8 to actuate the conveyer belt 10. A chain tightener 32 is connected to the side bar 6 for taking up the slack of the chain 30. A series of curved strippers 33 are secured to the bottom 7 of the conveyer and extend around the upper portion of the conveyer and around the roller 8, said strippers being secured at 34 to the bottom 7 of the conveyer. These strippers prevent the hay from being carried around and under the conveyer and serve to strip the hay from the flights or fingers 11 on the belts 10.

To prevent the wind from sweeping the hay from the conveyer, a shielding frame composed of longitudinal rods 35 is provided, said rods 35 being secured to a cross bar 36, the downwardly bent ends 37 of which are secured to the side bars 6 of the conveyer frame. The lower ends of the rods 35 are supported by a cross bar 38, Fig. 3. A bracket 39 supported on each of the side bars 6 is provided with a bearing for a roller 40 and the shaft of this roller carries a gear wheel 41 which meshes with a gear wheel 42 mounted on the shaft 57 which carries the rake teeth 56, said shaft carrying a sprocket wheel upon which the chain 43 is mounted and a sprocket wheel 44 journaled at the side of one of the bars 6 in the bracket 45 engages the sprocket chain 43 to actuate the traveling gatherer 46. This gatherer 46 comprises a frame consisting of side bars 47 in which the rollers 40 and 48 are journaled and traveling belts 49 provided with outwardly projecting fingers 50 pass over the rollers 40 and 48. The side bars 47 are journaled on the shaft 57. The lower end of the gatherer is mounted adjustably upon curved rods 51 mounted in brackets 52 on the side bars 6 and a spring 53 surrounding the rod 51 is adjustable in tension by means of collars 54 to hold the gatherer down in position to collect the hay and carry it up underneath the gatherer to the traveling conveyer. The gatherer may be raised to a position above the ground by sliding the collars 54 upon the rods 51 and securing the same by the set screws 55.

The rake teeth 56 are secured to a shaft 57 journaled at its ends in the brackets 39 and a lever 58 secured to the end of the shaft 57 serves to raise and lower the teeth 56 and to hold the same in adjusted position by means of a sector rack 59 secured to the brackets 39.

On the inner surfaces of the hub of the ground wheels 2 are secured ratchet wheels 60 to be engaged by pawls 61 pivoted to the hubs and provided with bearing springs 62 for holding the pawls into engagement with the ratchets 60. The purpose of this construction is to prevent the retrograde movement of one or the other of the ground wheels 2 in turning the machine.

The operation of our rake may be briefly described as follows: The inclination of the endless conveyer is adjusted at the required position by means of the bars 23 and the bolts 25 and the clevis 4 is connected to the rear end of a hay wagon. When the machine is drawn over the field, the rake teeth 56 gather the hay and present it to the flights or fingers 11 of the endless conveyer, while the leaves of the alfalfa are gathered by the traveling gatherer and carried up and deposited upon the conveyer 10, said gatherer being adjustable at its lower end to the required distance from the ground by means of the springs 53 and the set collars 54. As the hay passes up over the conveyer, the wind shield 35 prevents the wind from carrying the hay off the conveyer. The strippers 33 remove the hay from the fingers 11 and deposit it in the wagon. When the conveyer is to be thrown out of operation, the lever 20 is operated to shift the clutch 14, 15. The conveyer may then be lowered by means of the bars 23 and the bolt 25.

From the foregoing it will be obvious that an implement made in accordance with our invention will operate efficiently to gather the hay and carry it up and deposit it into a wagon, the traveling gatherer serving to collect the leaves of the alfalfa and deposit them upon the endless conveyer.

Having thus described our invention, what is claimed is:

1. In a hay rake, the combination of a series of rake teeth, a traveling conveyer for receiving the hay from the teeth, and a gatherer comprising rollers, a series of belts provided with teeth and mounted upon said rollers, said belts being disposed between the rake teeth, means for moving the belts, and means for adjusting the gatherer vertically, substantially as described.

2. In a hay rake, the combination of a series of rake teeth, an endless conveyer, means for adjusting said conveyer at different degrees of inclination, curved strippers secured at their ends to the conveyer frame, and a traveling spring mounted gatherer comprising belts mounted upon rollers, said belts having projecting fingers thereon, and said belts being disposed between the rake teeth.

3. In a hay rake, the combination of a series of rake teeth, an endless conveyer, and a traveling gatherer, curved rods, said gatherer being adjustable upon said curved rods, and surrounding said rods, substantially as described.

4. In a hay rake, the combination of a series of rake teeth, a conveyer, a wind shield comprising longitudinal rods and cross bars, strippers on the conveyer, and a traveling gatherer comprising belts armed with teeth and said belts being located between the rake teeth, said gatherer being mounted to yield in operation, and means for adjusting said gatherer vertically, substantially as described.

In testimony whereof, we affix our signatures in presence of two witnesses.

JENS N. JEPPESEN.
NIELS MICHELSEN.

Witnesses:
W. W. CLARK,
JAMES N. JENSEN.